United States Patent Office 3,350,464
Patented Oct. 31, 1967

3,350,464
1-HYDRO-PERHALOGENATED CYCLOPENTA-
NOLS AND CYCLOHEXANOLS
Louis G. Anello, Basking Ridge, and Richard F. Sweeney, Randolph Township, N.J., assignors to Allied Chemical Corporation, New York, N.Y., a corporation of New York
No Drawing. Filed Jan. 11, 1965, Ser. No. 424,827
15 Claims. (Cl. 260—617)

This invention relates to the production of a novel class of 1-hydro-perhalogenated cycloalkyl alcohols.

It is an object of this invention to provide a novel class of chemical compounds and more particularly, to provide a class of 1-hydro-perhalogenated cyclopentyl and cyclohexyl alcohols, the halogen atoms being fluorine or chlorine, there being a minimum of two fluorine atoms ring-substituted in the molecule.

Other objects and advantages will be apparent from the following description and discussion of the subject invention.

In accordance with the invention, a novel class of 1-hydro-perhalogenated cycloalkanols having the formula:

I

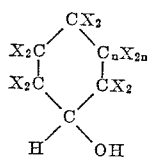

wherein X may be F or Cl and $n$ may be 0 or 1, there being present at least two fluorine atoms in the molecule, may be produced by reducing the corresponding perhalogenated cycloalkanone having the formula:

II

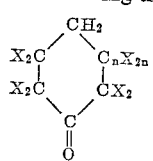

wherein X and $n$ are as defined above, with sodium borohydride.

All of the novel 1-hydro-perhalogenated cycloalkanols embraced by Formula I are characterized by the fact that: (a) said compounds contain a hydrogen atom bonded to the same carbon atom to which the —OH group is attached, (b) that the ring structure of the compounds is otherwise perhalogenated with chlorine or fluorine atoms and (c) that the ring is substituted with at least two fluorine atoms. The novel compounds can be referred to generically as 1-hydro-perhalogenated cycloalkanols containing 5 or 6 carbon atoms. Characteristics common to all of these 1-hydro-perhalogenated cycloalkanols are that they are useful as solvents for Capran (Nylon-6) and are useful as intermediates for the preparation of monomers, which may in turn be used to prepare valuable polymers and synthetic resins.

It has been found that those 1-hydro-perhalogenated cycloalkanols within the scope of the invention, which possess at least two ring-substituted chlorine atoms and particularly those compounds having the formula:

III

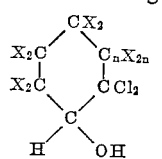

wherein X may be F or Cl and $n$ may be 0 or 1, there being present at least two fluorine atoms in the molecule, possess a characteristic not possessed by other compounds falling within the scope of Formula I, in that such compounds are useful as solvents and sealing adjuvants for films of polytrifluorochloroethylene.

It has further been found that those 1-hydro-perhalogenated cycloalkanols within the scope of the invention, which possess only fluorine substitution on the ring-carbon atoms, viz compounds of the formula:

IV

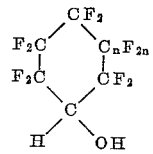

wherein $n$ may be 0 or 1, possess characteristics not possessed by any other compounds falling within the scope of Formula I, in that such compounds are useful as nematocides and insecticides. The compound defined by Formula IV wherein $n$ is 0, is particularly effective as an insecticide.

As illustrative of the scope and intendment of the invention, the following represents a partial listing of the novel compounds falling within the scope of the invention; it being understood that this listing is for illustrative purposes only, said listing not being all inclusive and the inventors not limited thereby, but only by the scope of the invention as defined in the claims:

1-hydro-2,2-dichlorohexafluorocyclopentanol
1-hydro-2,2-dichlorooctafluorocyclohexanol
1-hydro-4,4-dichlorooctafluorocyclohexanol
1-hydro-3,4-dichlorohexafluorocyclopentanol
1-hydro-2,2,3,3-tetrachlorohexafluorocyclohexanol
1-hydro-2,2,5,5-tetrachlorohexafluorocyclohexanol
1-hydro-3,3,4,4-tetrachlorotetrafluorocyclopentanol
1-hydro-2,2,3,3,4,4-hexachlorotetrafluorocyclohexanol
1-hydro-2,2,3,3,4,4,5,6-octachlorodifluorocyclohexanol
1-hydro-2,2,3,3,4,4-hexachlorodifluorocyclopentanol
1-hydrooctafluorocyclopentanol
1-hydrodecafluorocyclohexanol Perhalogenated cycloalkanone starting materials containing at least two chlorine atoms may be prepared by the photochlorination of 1-chloro-2-alkoxy-perhalogenated cyclohexenes and cyclopentenes, in which the halogen atoms may be fluorine or chlorine. The alkoxy group in the latter described class of compounds is preferably a lower alkoxy group and the reaction is preferably carried out at a temperatures below about 100° C. The process is more fully described in co-pending application of Louis G. Anello and Richard F. Sweeney, Ser. No. 420,154, filed Dec. 21, 1964, which application is in turn a continuation-in-part of copending application of Louis G. Anello and Richard F. Sweeney, Ser. No. 381,229, filed July 8, 1964, now abandoned.

Perhalogenated cycloalkanone starting materials in which all of the halogen atoms are fluorine may be prepared by perfluorinating perchlorofluorocycloaliphatic, saturated ketones, in which all chlorine atoms present are substituted on one or more cyclic carbon atoms which are in a position alpha to the ketone group; with potassium fluoride (KF) in the presence of an inert polar solvent. This process is preferably carried out at temperatures above about 130° C. and is more fully described in co-pending, commonly assigned application of Louis G. Anello and Richard F. Sweeney, Ser. No. 427,-484, filed Jan. 22, 1965. Other procedures for preparing starting materials, according to the invention process, will occur to persons skilled in the art.

The sodium borohydride reduction of the perhalogenated cycloalkanones defined by Formula II, hereinafter referred to as ketone, to the 1-hydro-perhalogenated cycloalkanols defined by Formula I, hereinafter referred to as alcohol, can be carried out in an ordinary reaction vessel constructed of glass or steel, for example, which reaction vessel may be optionally equipped with a dropping funnel, a condenser, a stirrer, a thermometer and heating or cooling means.

The amount of sodium borohydride required to effect reduction of ketone to alcohol may vary from about .1–2 moles of sodium borohydride for each mole of ketone. Substantial reduction is effected when the molar ratio of sodium borohydride to ketone is about 1:1. Use of sodium borohydride in excess of about 2 moles per mole of ketone does not produce any advantageous results but does not deleteriously affect the reaction, excepting that recovery of sought-for product will be more difficult, due to contamination of the product with unreacted sodium borohydride and complexes thereof. In general, mole ratios of about .5–2 moles of sodium borohydride per mole of ketone are preferred.

In carrying out the reaction, ketone may be added to the borohydride or vice-versa, however the addition of ketone to the borohydride is preferred.

The reduction reaction is preferably carried out in the presence of a polar solvent which is inert to reactants and products, such as methanol, ethanol, dioxane, diethyl ether, diethylene glycol diethyl ether (diglyme), and the like. The inert polar solvent should be used in substantially anhydrous form.

The reduction reaction is exothermic and ordinarily temperatures, resulting from initial contacting and mixing of ketone and sodium borohydride, will reach about 30°–45° C. For maximum efficiency, temperatures in the reaction vessel should not be permitted to exceed the boiling point of the chosen solvent. This can be readily accomplished by regulating the rate of addition of reactants, by external cooling means, or by a combination of the above. It has been found that best results are obtained when the reaction is carried out in two stages; a first stage of about 1–3 hours, in which the reaction temperature is not permitted to exceed about 45° C., and a second stage of about the same period of time or longer, in which the reaction temperature is increased to about 50°–60° C., solvent permitting.

Reaction times are not critical and will vary depending upon such factors as particular reactants employed, reactant concentrations, rate of contacting reactants, reaction temperatures, and so forth. Some yield of alcohol will be produced in a very short period of time. Substantial yields are obtained after a reaction period of at least one hour, with substantially maximum yields being obtained after a total reaction period of about 5–10 hours. Reaction periods may be extended, if desired, up to about 24 hours or more, without any adverse effects.

Although the process can be carried out under atmospheric, subatmospheric or superatmospheric pressure; atmospheric pressure is effective, is most practical and accordingly is preferred.

Product recovery involves separation of sought-for alcohol reduction product from unreacted NaBH$_4$ and NaBH$_4$ complexes, which are formed during the course of the reaction. This can readily be accomplished by decomposing the excess borohydride and complexes with an acid, such as dilute acetic, HCl and H$_2$SO$_4$, to soluble salts which can be separated from the crude alcohol product, following which the crude alcohol may be recovered by distillation and further purified by fractionation.

The following examples will serve to illustrate the objects and practice of the present invention. Parts and percentages are by weight unless otherwise stated.

*Example 1*

A 100 ml. three-necked flask, equipped with a dropping funnel, a stirrer, a thermometer and a condenser, was charged with a mixture of 8.0 g. (0.21 mole) of NaBH$_4$ and 50 ml. of anhydrous ether (diethyl ether). 55 g. (0.21 mole) of 2,2-dichlorohexafluorocyclopentanone were added gradually to the above mixture, with stirring. Addition of the ketone was regulated so that the temperature in the reaction flask did not exceed about 35° C. After the addition of the ketone was complete, the reaction mixture was refluxed at 45° C. for about 18 hours. At the end of this period, the excess NaBH$_4$ reagent and NaBH$_4$ complexes formed were decomposed by the addition of 40 ml. of 20% HCl. The product mixture consisted of a heavy oil layer and a lighter aqueous layer. The oil layer was separated from the aqueous layer and the aqueous layer was extracted with anhydrous ether. The oil layer was then combined with the ethereal extracts from the aqueous layer and the mixture was dried over CaCl$_2$ and distilled to give 41.0 g. (0.156 mole) of 1-hydro-2,2-dichlorohexafluorocyclopentanol (B.P. 67°–69° C./76 mm.).

*Analysis.*—Calculated for C$_5$H$_2$Cl$_2$F$_6$O: Percent C, 22.80; percent F, 43.34; percent Cl, 26.99; percent H, 0.76. Found: Percent C, 22.5; percent F, 42.7; percent Cl, 26.50; percent H, 0.84.

Infrared spectrographic analysis of this product showed a hydroxy absorption band at 3.0 microns and a hydrogen band at 3.35 microns, thus confirming the identification of the product. The product was obtained in a yield of about 74%, based upon starting material charged.

*Example 2*

A 100 ml. three-necked flask, equipped with a dropping funnel, a stirrer, a thermometer and a condenser, was charged with a mixture of 8.0 g. (0.21 mole) of NaBH$_4$ and 50 ml. of anhydrous ether. 59 g. (0.19 mole) of 2,2-dichlorooctafluorocyclohexanone were added gradually to the reaction mixture, with stirring. Addition of the ketone was regulated so that the temperature in the reaction flask did not exceed about 35° C. After the addition of the ketone was complete, the reaction mixture was refluxed at 45° C. for about 6 hours. At the end of this period, the excess NaBH$_4$ reagent and NaBH$_4$ complexes formed were decomposed by the addition of 40 ml. of 20% HCl. The reaction product was worked up in the same manner as described in Example 1. 30 g. (0.096 mole) of 1-hydro-2,2-dichlorooctafluorocyclohexanol (B.P. 72° C./40 mm.) were recovered in a yield of about 50%.

*Analysis.*—Calculated for C$_6$H$_2$Cl$_2$F$_8$O: Percent C, 23.00; percent F, 48.56; percent Cl, 22.68; percent H, 0.64. Found: Percent C, 22.5; percent F, 47.8; percent Cl, 22.2; percent H, 0.78.

Infrared spectrographic analysis of this product showed a hydroxyl absorption band at 3.0 microns and a hydrogen band at 3.35 microns, thus confirming the identification of the product.

*Example 3*

A 500 ml. three-necked flask, equipped with a dropping funnel, a stirrer, a thermometer and a condenser, was charged with a mixture of 1.0 g. (0.026 mole) of NaBH$_3$ and 23 g. of dioxane. To this mixture was added a solution of 30 g. (0.087 mole) of 2,2,3,3-tetrachlorohexafluorocyclohexanone in 25 g. of dioxane, gradually over a period of about two hours, with stirring. Addition of the ketone solution was regulated so that the temperature in the reaction flask did not exceed about 40° C. After the addition of the ketone solution was complete, the temperature in the reaction vessel was raised to about 50° C. and the reaction mixture was stirred at that temperature for an additional period of about two hours. At the end of this period, the excess NaBH$_4$ reagent and NaBH$_4$ complexes formed, were decomposed by the addition of 40 ml. of 10% HCl. The reaction product was worked up in the same manner as in the previous examples. 19 g. (0.055 mole) of 1-hydro-2,2,3,3-tetrachlorohexafluorocyclohexanol (B.P. 136° C., M.P. 106° C.) were recovered in a yield of about 63%.

*Analysis.*—Calculated for $C_6H_2Cl_4F_6O$: Percent Cl, 41.04; percent F, 32.95; percent H, 0.58. Found: Percent Cl, 39.7; percent F, 32; percent H, 0.7.

Infrared spectrographic analysis of the product showed a hydroxyl absorption band at 3.0 microns and a hydrogen band at 3.35 microns, thus confirming the identification of the product.

Example 4

A 500 ml. three-necked flask, equipped with a dropping funnel, a stirrer, a thermometer and a condenser, is charged with a mixture of 1.0 g. (0.026 mole) of $NaBH_4$ and 23 g. of dioxane. To this mixture is added a solution of 30 g. (0.073 mole) of 2,2,3,3,4,4,5,5-octachlorodifluorocyclohexanone in 25 g. of dioxane, gradually over a period of about two hours, with stirring. Addition of the ketone solution is regulated so that the temperature in the reaction flask does not exceed about 40° C. After the addition of the ketone solution is complete, the temperature in the reaction vessel is raised to about 50° C. and the reaction mixture is stirred at that temperature for an additional period of about two hours. At the end of this period, the excess $NaBH_4$ reagent and $NaBH_4$ complexes formed are decomposed by the addition of 40 ml. of 10% HCl. The reaction product is worked up in the same manner as described in the previous examples. Product recovered is 1-hydro-2,2,3,3,4,4,5,5-octachlorodifluorocyclohexanol.

Example 5

A 250 ml. three-necked flask, equipped with a dropping funnel, a stirrer, a thermometer and a reflux condenser, was charged with a mixture of 4.5 g. (0.12 mole) of $NaBH_4$ and 61 g. of anhydrous diglyme (diethylene glycol diethyl ether). To this mixture were slowly added 50 g. (0.18 mole) of perfluorocyclohexanone, with stirring, over a period of about three hours. Addition of the ketone was regulated so that the temperature in the reaction flask did not exceed about 30°–35° C. After the addition of the ketone was complete, the temperature in the reaction vessel was raised to about 60° C. and the reaction mixture was stirred at that temperature for an additional period of about three hours. At the end of this period, the reaction product mixture was cooled to room temperature and the excess $NaBH_4$ reagent and $NaBH_4$ complexes contained therein, were decomposed by the addition of 85 ml. of about 10% HCl. The product mixture in the reaction flask consisted of a heavy oil layer and a lighter water layer. The heavy oil layer was separated from the water layer, then washed with small portions of dilute HCl and then distilled from 60 g. of 95% $H_2SO_4$. In this manner, about 60 g. of crude 1-hydrodecafluorocyclohexanol were obtained. The product was further purified by redistillation from about 46 g. of 95% $H_2SO_4$. From the redistillation, 45 g. (0.160 mole) of 1-hydrodecafluorocyclohexanol (B.P. 106°–108° C., M.P. 66°–68° C.) were recovered, representing a yield of about 89%.

*Analysis.*—Calculated for $C_6H_2F_{10}O$: Percent F, 67.9; percent H, 0.71. Found: Percent F, 66.5; percent H, 0.8.

Infrared spectrographic analysis of the product showed a hydroxyl absorption band at 3.0 microns and a hydrogen band at 3.35 microns, thus confirming the identification of the product.

Example 6

Into the identical apparatus as described in Example 5 was charged a mixture of 11 g. (0.29 mole) of $NaBH_4$ and 120 g. of anhydrous diglyme. To this mixture were slowly added 70 g. (0.31 mole) of perfluorocyclopentanone, with stirring, over a period of about three hours. Addition of the ketone was regulated so that the temperature in the reaction flask did not exceed about 30°–35° C. After the addition of the ketone was complete, the temperature in the reaction vessel was raised to about 60° C. and the reaction mixture was stirred at that temperature for an additional period of about three hours. At the end of this period, the reaction product mixture was cooled to room temperature and the excess $NaBH_4$ reagent and $NaBH_4$ complexes contained therein, were decomposed by the addition of 85 ml. of about 10% HCl. The product mixture in the reaction flask consisted of a heavy oil layer and a lighter water layer. The heavy oil layer was separated from the water layer, then washed with small portions of dilute HCl and then distilled from about 60 g. of 95% $H_2SO_4$ under vacuum. In this manner, about 60 g. of crude 1-hydrooctafluorocyclopentanol were obtained. The product was further purified by redistillation from about 54 g. of 95% $H_2SO_4$. From the redistillation, 54 g. (0.23 mole) of 1-hydrooctafluorocyclopentanol (B.P. 86°–87° C.) were recovered representing a yield of about 77%.

*Analysis.*—Calculated for $C_5H_2F_8O$: percent F, 66.09; percent H, 0.87. Found: percent F, 66.3; percent H, 1.0.

Infrared spectrographic analysis of the product showed a hydroxyl absorption band at 3.0 microns and a hydrogen band at 3.35 microns, thus confirming the identification of the product.

Example 7

1-hydro-2,2,3,3-tetrachlorohexafluorocyclohexanol and 1-hydro-2,2-dichlorooctafluorocyclohexanol were tested as sealing adjuvants for thermoplastic film composed of a copolymer of about 96% trifluorochloroethylene and about 4% vinylidene fluoride. Saturated solutions of this polymer in the above alcohols were prepared by separately refluxing 1-hydro-2,2,3,3-tetrachlorohexafluorocyclohexanol and 1-hydro-2,2-dichlorooctafluorocyclohexanol with said polymer, cooling the mixtures to room temperature and decanting the solutions from the undissolved polymer. A pair of polymer film strips was sealed together without the use of sealing adjuvant. Two more pairs of polymer film strips were sealed together, this time employing as sealing adjuvant, the two above described polymer solutions in the alcohol products, one of said solutions for each of the pairs of polymer film strips. The sealing adjuvant solutions were applied by merely coating, as by brushing, the inner surfaces of the film strips to be sealed. In all cases, an impulse heat sealer was used. The impulse heat sealer was a Sentinel Impulse Sealer manufactured by Packaging Industries, Inc., of Montclair, New Jersey. The sealing pressure was 30 p.s.i. The heat sealing temperature was 375° F. The dwell time for the seal, or in other words, the length of time during which the pressure and heat were applied to effect the seal, was three (3) seconds. The sealing adjuvants not only formed a strong seal between the polymer film strips but, additionally, strengthened the polymer film in the vicinity of the seal in varying degrees, for when it was attempted to test the seal strength by measuring the amount of force needed to rupture or pull apart the seal, it was found that the polymer film ruptured before the seals, at a point away from the sealing area. As can be seen from the following table, the polymer film pairs sealed with the adjuvant solutions, ruptured at weights considerably higher than the film pair which was not so treated.

TABLE I

| | Wgt. to effect rupture, g. |
|---|---|
| Film strips heat-sealed without the use of adjuvant | <10 |
| Film strips heat-sealed with a polymer solution in 1-hydro-2,2,3,3-tetrachlorohexafluorocyclohexanol | >2,599 |
| Film strips heat-sealed with a polymer solution in 1-hydro-2,2-dichlorooctafluorocyclohexanol | >130 |

When other chlorine containing alcohols within the scope of the invention are employed as sealing adjuvants for such polymer film strips, as described above, substantially equivalent results are obtained, i.e. film strips heat-sealed using such materials as sealing adjuvants rupture at weights considerably higher than film strips heat-sealed without the use of sealing adjuvant.

Although a copolymer of about 96% trifluorochloroethylene and about 4% vinylidene fluoride was employed, a wide variety of polymers, terpolymers and copolymers of trifluorochloroethylene may be employed, also with equivalent results; homopolymeric trifluorochloroethylene and copolymers of trifluorochloroethylene with vinyl chloride, 1,1-chlorofluoroethylene, trifluoroethylene and perfluorobutadiene being exemplary. In general, most suitable are those compositions containing upwards of 50% by weight of trifluorochloroethylene. The general class of compositions described above can be referred to generically as polytrifluorochloroethylene.

Example 8

A mixture of one part Capran film and 10 parts of 1-hydrooctafluorocyclopentanol is refluxed in a 100 ml. round bottom flask for a period of one hour. A viscous homogeneous solution is obtained after the reflux mixture cools to room temperature. Three parts of water are added to the viscous solution and the mixture is again heated to reflux temperature. The addition of the three parts of water markedly reduces the viscosity of the solution with no indication of precipitation of the Capran. An additional one part of Capran is added to the mixture and solution of the same is effected by continuing to heat the mixture to reflux temperature. A further addition of two parts of water again reduces the viscosity of the solution with no indication of precipitation of the Capran. A flexible, transparent, plastic (Capran) film is then easily prepared by flowing the solution of Capran, thus obtained by the above procedure, on to a polished plate, evaporating the essentially alcohol solvent and peeling the resulting film from the plate.

Example 9

The procedure of Example 8 is repeated, excepting that a mixture of one part Capran to 10 parts of 1-hydrodecafluorocyclohexanol is initially employed. A flexible, transparent, plastic (Capran) film may be easily prepared from a solution of Capran in the 1-hydrodecafluorocyclohexanol solvent, as described in above Example 8.

Example 10

Fumigant tests for 1-hydrooctafluorocyclopentanol and 1-hydrodecafluorocyclohexanol were run against three important common pests: confused flower bettle larvae, lesser mealworm larvae and black carpet bettle larvae. All tests were run under substantially identical conditions. In carrying out these tests, tins having perforated lids and containing the insects and small amounts of appropriate food, such as grain or flour, are placed in a gallon Mason jar. 0.1 cc. units of 1-hydrooctafluorocyclopentanol toxicant are pipetted onto absorbent cellulose wads placed in the jars containing the various insects and 0.1 g. units of 1-hydrodecafluorocyclohexanol are placed onto absorbent cellulose wads in the other specimen jars. The jars are then sealed. After about a 24 hour exposure the insect containers are removed. Mortality counts are made three days later. The results of these tests are set forth in Table II.

TABLE II

| | Percent Mortality | | |
|---|---|---|---|
| | CFBL | LML | BCBL |
| 1-hydrooctafluorocyclopentanol | 100 | 100 | 100 |
| 1-hydrodecafluorocyclohexanol | 40 | 100 | 100 |
| Control | 0 | 0 | 0 |

CFBL—Confused Flour Beetle Larvae; LML—Lesser Mealworm Larvae; BCBL—Black Carpet Beetle Larvae.

Example 11

Follow-up fumigant tests of the compounds tested in the previous example were run against the same pests with reduced dosages of toxicant and additionally, against yellow mealworm larvae. The tests were run according to the same procedure described in the previous example, excepting that .025 cc. units of 1-hydrooctafluorocyclopentanol and .025 g. units of 1-hydrodecafluorocyclohexanol were placed onto the absorbent cellulose wads. The insect containers were removed as before after about a 24 hour exposure and mortality counts were made three days later. The results of these tests are set forth in Table III.

TABLE III

| | Percent Mortality | | | |
|---|---|---|---|---|
| | CFBL | LML | BCBL | YML |
| 1-hydrooctafluorocyclopentanol | 100 | 100 | 100 | 100 |
| 1-hydrodecafluorocyclohexanol | 80 | 0 | 40 | 0 |
| Control | 0 | 0 | 0 | 0 |

YML—Yellow Mealworm Larvae.

Example 12

The nematocidal activities of 1-hydrooctafluorocyclopentanol and 1-hydrodecafluorocyclohexanol were tested by a procedure essentially as described in Examples 10 and 11. As before, tins having perforated lids, this time containing cultures of Panagrellus redivivus (Linne') nematode, along with small amounts of appropriate food, were placed in gallon Mason jars. 0.1 cc. units of 1-hydrooctafluorocyclopentanol and 1 g. units of 1-hydrodecafluorocyclohexanol were placed onto absorbent cellulose wads positioned in the jars. The jars were then sealed. After about a 20 hour exposure, the containers were removed. Mortality counts were made immediately, and at one day intervals for three days. The results of these tests are set forth in Table IV.

TABLE IV

| | Percent Mortality | | | |
|---|---|---|---|---|
| | 0 days | 1 day | 2 days | 3 days |
| 1-hydrooctafluorocyclopentanol | 100 | 100 | 100 | |
| 1-hydrodecafluorocyclohexanol | 100 | 100 | | 100 |
| Control | 0 | 0 | 0 | 0 |

Since various changes and modifications may be made without departing from the spirit of the invention, the invention is to be limited only by the scope of the appended claims.

We claim:
1. 1-hydro-perhalogenated cycloalkanols of the formula:

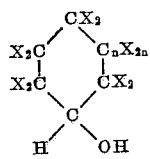

wherein X may be F or Cl and $n$ may be 0 or 1, there being present at least two fluorine atoms in the molecule.

2. 1-hydro-perhalogenated cycloalkanols as defined in claim 1 wherein $n$ is 0.

3. 1-hydro-perhalogenated cycloalkanols as defined in claim 1 wherein $n$ is 1.

4. 1-hydro-perhalogenated cycloalkanols of the formula:

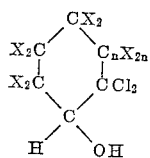

wherein X may be F or Cl, $n$ may be 0 or 1, there being present at least two fluorine atoms in the molecule.

5. 1-hydro-perhalogenated cycloalkanols as defined in claim 4 wherein $n$ is 0.

6. 1-hydro-perhalogenated cycloalkanols as defined in claim 4 wherein $n$ is 1.

7. 1-hydro-perhalogenated cycloalkanols of the formula:

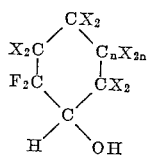

wherein X may be F or Cl and $n$ may be 0 or 1.

8. 1-hydro-perhalogenated cycloalkanols as defined in claim 7 wherein $n$ is 0.

9. 1-hydro-perhalogenated cycloalkanols as defined in claim 7 wherein $n$ is 1.

10. 1-hydro-perfluorinated cycloalkanols of the formula:

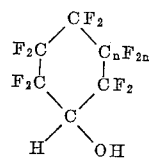

wherein $n$ may be 0 or 1.

11. 1-hydro-2,2,3,3-tetrachlorohexafluorocyclohexanol.
12. 1-hydro-2,2-dichlorooctafluorocyclohexanol.
13. 1-hydro-2,2-dichlorohexafluorocyclopentanol.
14. 1-hydrodecafluorocyclohexanol.
15. 1-hydrooctafluorocyclopentanol.

References Cited

UNITED STATES PATENTS 2,972,562  2/1961  Richter _____ 260—617 X
3,030,409  4/1962  Andreades et al. ___ 260—617 X

OTHER REFERENCES

Andreades et al.: "J. Am. Chem. Soc.," vol. 83, pp. 4670–1 (1961).

Chaikin et al.: "J. Am. Chem. Soc.," vol. 71, pp. 122–125 (1949).

Finger et al.: "J. Am. Chem. Soc.," vol. 73, pp. 145–9 (1951).

Jones et al.: "J. Am. Chem. Soc.," vol. 84, pp. 997–1001 (1962).

Le Bel et al.: "Chem. Abst.," vol. 56, p. 12759e (1962).

LEON ZITVER, *Primary Examiner.*

T. G. DILLAHUNTY, *Assistant Examiner.*